(12) United States Patent
Ryu

(10) Patent No.: US 11,849,059 B2
(45) Date of Patent: Dec. 19, 2023

(54) ELECTRONIC DEVICE

(71) Applicant: Samsung Display Co., Ltd., Yongin-si (KR)

(72) Inventor: Suchang Ryu, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/583,001

(22) Filed: Jan. 24, 2022

(65) Prior Publication Data

US 2023/0015303 A1   Jan. 19, 2023

(30) Foreign Application Priority Data

Jul. 13, 2021   (KR) .................. 10-2021-0091413

(51) Int. Cl.
*G06F 1/16* (2006.01)
*H04M 1/02* (2006.01)

(52) U.S. Cl.
CPC ........ *H04M 1/0214* (2013.01); *G06F 1/1616* (2013.01); *G06F 1/1643* (2013.01); *H04M 2250/22* (2013.01)

(58) Field of Classification Search
None
See application file for complete search history.

(56) References Cited

U.S. PATENT DOCUMENTS

| | | | |
|---|---|---|---|
| 10,119,683 B2 * | 11/2018 | Hirakata | ............... H04W 72/23 |
| 10,261,545 B2 * | 4/2019 | Kim | ................. B32B 27/40 |
| 10,586,941 B2 | 3/2020 | Lee et al. | |
| 10,691,177 B2 | 6/2020 | Quinn et al. | |
| 10,788,864 B2 | 9/2020 | Aurongzeb et al. | |
| 10,921,922 B2 * | 2/2021 | Kim | ...................... G06F 3/0421 |
| 11,481,003 B2 * | 10/2022 | Cho | ...................... G06F 1/1637 |
| 2021/0326569 A1 * | 10/2021 | Song | .................... G06F 1/1677 |
| 2022/0322542 A1 * | 10/2022 | Wu | ........................ G06F 1/1637 |
| 2023/0015303 A1 * | 1/2023 | Ryu | ...................... G06F 1/1641 |

FOREIGN PATENT DOCUMENTS

| | | |
|---|---|---|
| KR | 10-2017-0049777 A | 5/2017 |
| KR | 10-2017-0084402 A | 7/2017 |

* cited by examiner

*Primary Examiner* — Anthony Q Edwards
*Assistant Examiner* — Rashen E Morrison
(74) *Attorney, Agent, or Firm* — Lewis Roca Rothgerber Christie LLP

(57) ABSTRACT

An electronic device includes: a display panel having a first area and a second area, the second area being spaced apart from the first area in a first direction; a support plate under the display panel, the support plate including: a folding part configured to be folded about a folding axis extending in a second direction crossing the first direction; a first support part extending from the folding part in the first direction; and a second support part spaced apart from the first support part with the folding part therebetween; a first plate spaced apart from the first area of the display panel with the support plate therebetween; and an input sensor spaced apart from the second area of the display panel with the support plate therebetween and configured to sense an external input. The first plate and the input sensor face each other.

20 Claims, 10 Drawing Sheets

ELECTRONIC DEVICE

CROSS-REFERENCE TO RELATED APPLICATION

This application claims priority to and the benefit of Korean Patent Application No. 10-2021-0091413, filed on Jul. 13, 2021, in the Korean Intellectual Property Office, the disclosure of which is incorporated by reference herein in its entirety.

BACKGROUND

1. Field

Aspects of embodiments of the present disclosure relate to an electronic device.

2. Background of the Related Art

An electronic device has an active area that is activated in response to an electrical signal. Through the active area, the electronic device may sense an input applied from the outside and may display various images to provide information to a user. As electronic devices are developed to have various shapes, active areas having various shapes are implemented.

SUMMARY

Embodiments of the present disclosure provide a foldable electronic device for sensing an external input.

According to an embodiment, an electronic device includes: a display panel having a first area and a second area, the second area being spaced apart from the first area in a first direction; a support plate under the display panel, the support plate including: a folding part configured to be folded about a folding axis extending in a second direction crossing the first direction; a first support part extending from the folding part in the first direction; and a second support part spaced apart from the first support part with the folding part therebetween; a first plate spaced apart from the first area of the display panel with the support plate therebetween; and an input sensor spaced apart from the second area of the display panel with the support plate therebetween and configured to sense an external input. The first plate and the input sensor face each other.

When viewed on a plane, at least a portion of the first support part may overlap the first area.

When viewed on a plane, at least a portion of the second support part may overlap the second area.

When viewed on a plane, the first area may not overlap the input sensor.

When viewed on a plane, the second area may not overlap the first plate.

The electronic device may further include a second plate under the input sensor, and, when viewed on a plane, the second plate may overlap the second support part.

The second plate may have a different material from the first plate.

The electronic device may further include: a first cushion layer under the first plate; and a second cushion layer under the second plate.

The first cushion layer may have a smaller thickness than the second cushion layer.

When viewed on the plane, the first cushion layer may overlap the first area.

When viewed on the plane, the second cushion layer may overlap the second area.

The folding part may have a plurality of openings defined therein, and the plurality of openings may be spaced apart from each other in the first direction.

The electronic device may further include an adhesive layer under the support plate, and the input sensor and the first plate may be directly on a bottom of the adhesive layer.

When viewed on a plane, the input sensor and the first plate may not overlap each other.

According to an embodiment of the present disclosure, an electronic device includes: a display panel having a first non-folding area, a second non-folding area, and a folding area, the second non-folding area being spaced apart from the first non-folding area in a first direction, and the folding area being between the first non-folding area and the second non-folding area; a support plate under the display panel; a first plate overlapping the first non-folding area when viewed on a plane and under the support plate; and an input sensor overlapping the second non-folding area when viewed on the plane and under the support plate. The input sensor is configured to sense an external input, and, when viewed on the plane, the input sensor and the first plate do not overlap each other.

When viewed on the plane, the first non-folding area may not overlap the input sensor.

When viewed on the plane, the second non-folding area may not overlap the first plate.

The electronic device may further include: a first cushion layer under the first plate; and a second cushion layer under the input sensor.

The first cushion layer may have a greater thickness than the second cushion layer.

When viewed on the plane, the first cushion layer may not overlap the first non-folding area and the second cushion layer may not overlap the second non-folding area.

BRIEF DESCRIPTION OF THE FIGURES

The above and other aspects and features of the present disclosure will become apparent by describing, in detail, embodiments thereof with reference to the accompanying drawings, in which.

DETAILED DESCRIPTION

Figure 1:
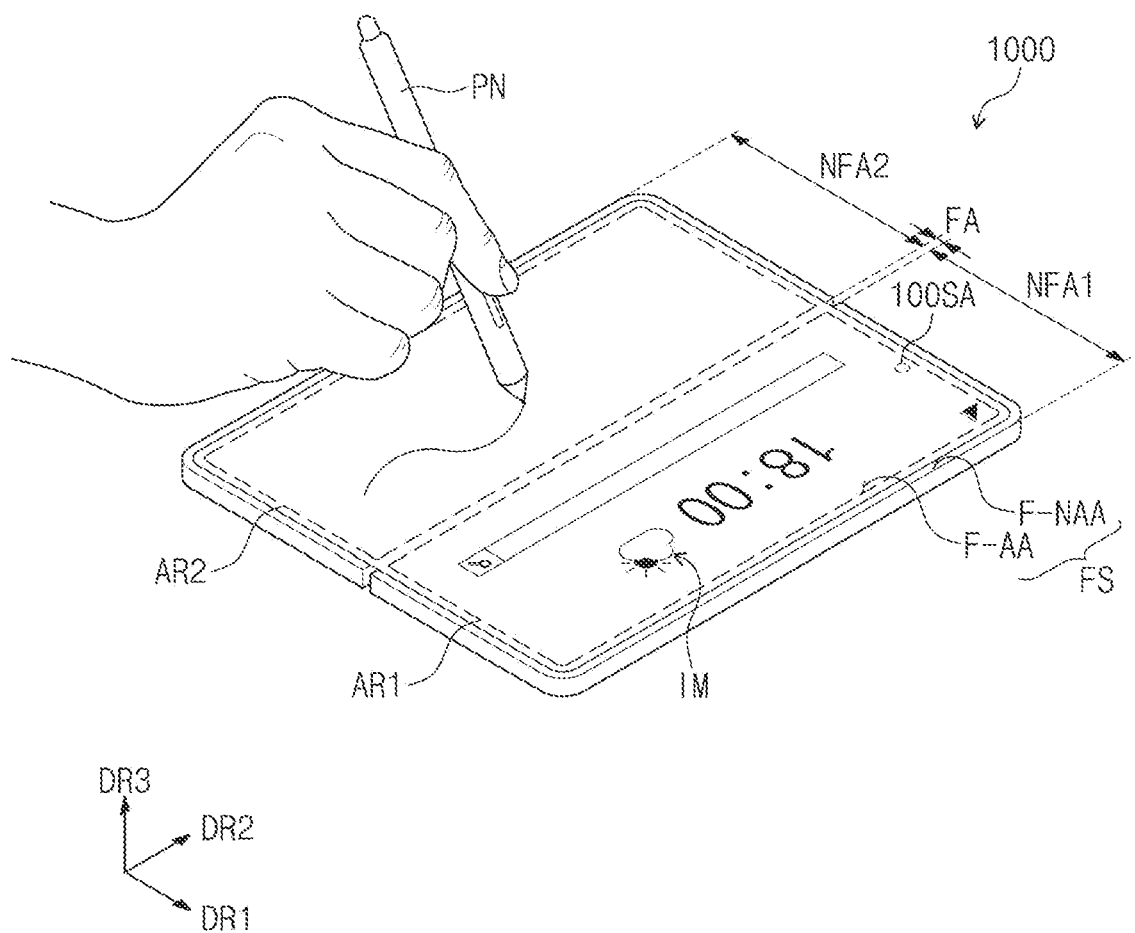
FIG. 1 is a perspective view of an electronic device according to an embodiment of the present disclosure.

In this specification, when a component (or, an area, a layer, a part, etc.) is described as being "on," "connected to," or "coupled to" another component, the component may be directly on, connected to, or coupled to the other component or a another component may be present therebetween.

Identical reference numerals refer to identical components. Additionally, in the drawings, the thicknesses, proportions, and dimensions of components may be exaggerated for effective description. As used herein, the term "and/or" includes all of one or more combinations defined by related components.

Terms, such as first, second, and the like, may be used to describe various components, but the components should not be limited by the terms. The terms are used to distinguish one component from other components. For example, a first component may be referred to as a second component, and similarly, the second component may also be referred to as the first component without departing the scope of the present disclosure. The terms of a singular form may include plural forms unless otherwise specified.

In addition, terms such as "below," "under," "above," and "over" are used to describe a relationship of components illustrated in the drawings. The terms are relative concepts and are described based on directions illustrated in the drawing.

It should be understood that terms, such as "comprise," "include," "have," and variations thereof, when used herein, specify the presence of stated features, numbers, steps, operations, components, parts, or combinations thereof but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application.

Hereinafter, embodiments of the present disclosure will be described with reference to the accompanying drawings.

Figure 2A:
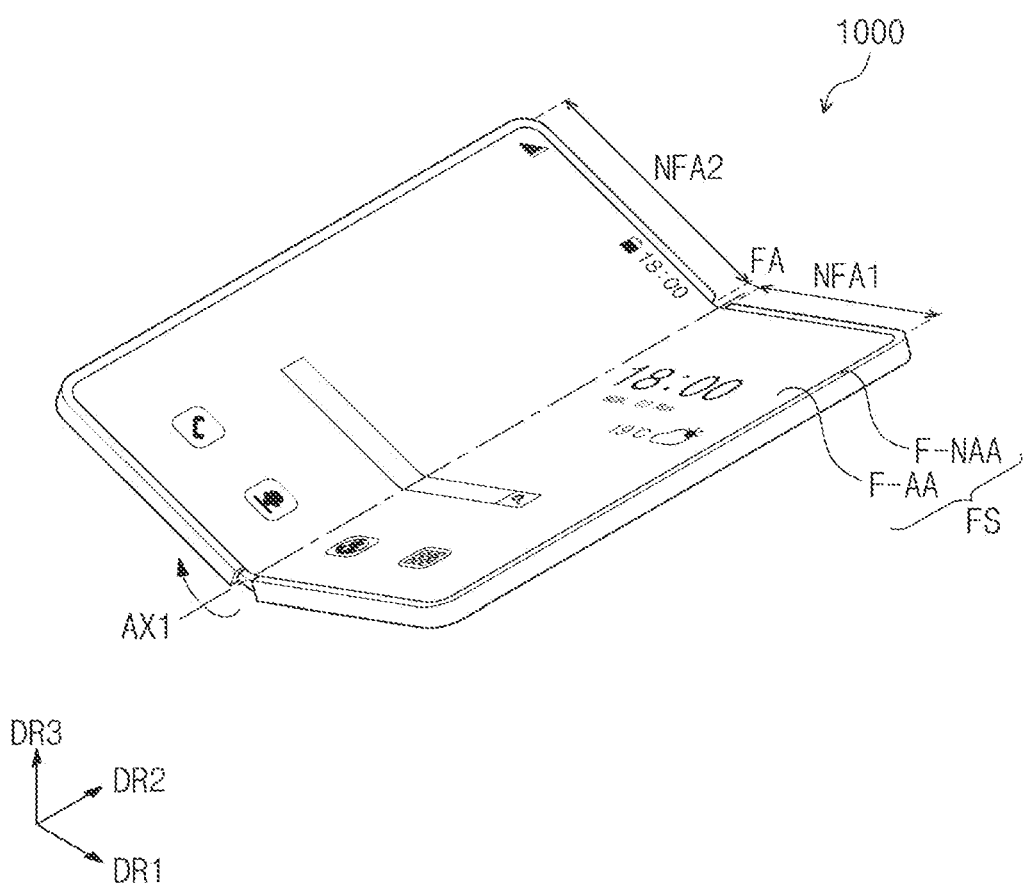
FIGS. 2A, 2B, and 3 are perspective views of the electronic device shown in FIG. 1 in a folded state according to an embodiment of the present disclosure.
Figure 2B:
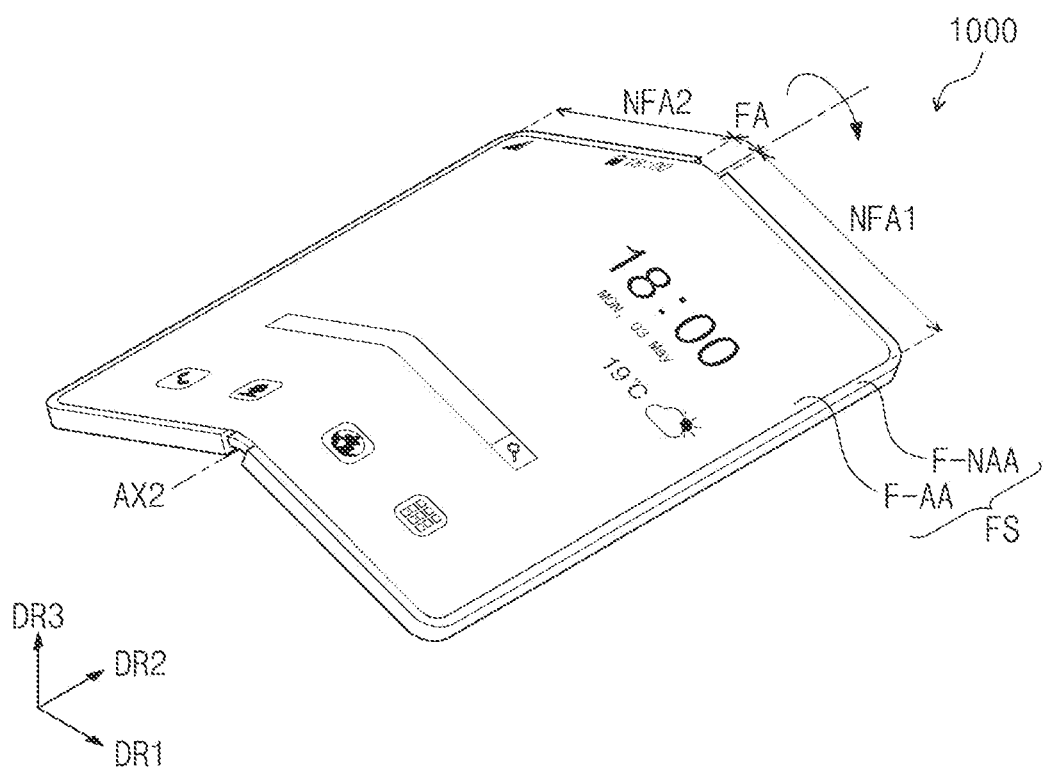
Figure 3:
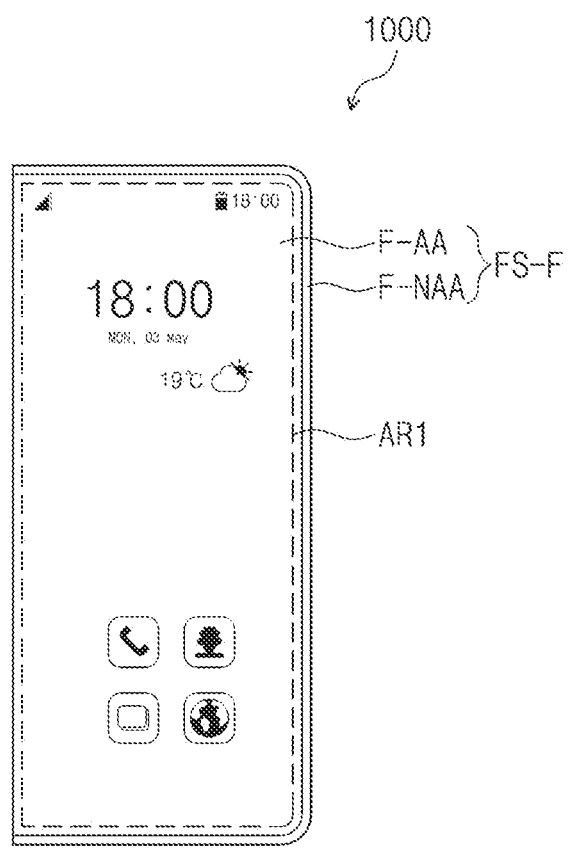

FIG. 1 is a perspective view of an electronic device according to an embodiment of the present disclosure. FIGS. 2A and 2B are perspective views of the electronic device shown in FIG. 1 in a folded state (e.g., a partially folded state) according to an embodiment of the present disclosure. FIG. 3 is a perspective view of the electronic device shown in FIGS. 1, 2A, and 2B in a fully folded state according to an embodiment of the present disclosure.

Referring to FIGS. 1 to 3, the electronic device 1000 may be activated in response to an electrical signal. The electronic device 1000 may include various embodiments. For example, the electronic device 1000 may include a tablet computer, a notebook computer, a computer, a smart television, or the like. In this embodiment, the electronic device 1000 is illustrated as a smart phone as an example.

A display surface FS may be parallel to a plane defined by a first direction DR1 and a second direction DR2. The normal direction of the display surface FS, that is, the thickness direction of the electronic device 1000, may be indicated by a third direction DR3. The electronic device 1000 may display an image IM on the display surface FS in the third direction DR3. Front surfaces (or upper surfaces) and rear surfaces (or lower surfaces) of respective members may be distinguished from each other by the third direction DR3. As used herein, the expression "on a plane" may mean that it is viewed in the third direction DR3.

The image IM may include a still image as well as a dynamic image. In FIGS. 1 to 3, an Internet search window and a clock window are illustrated as examples of the image IM.

The electronic device 1000 may sense an external input applied from the outside. The external input may be a user input. The user input may include various forms of inputs, such as a part of a user's body, an electro-magnetic pen PN, light, heat, pressure, or the like.

For example, the external input may include not only a touch of a part of the user's body (e.g., the user's hand) on the electronic device 1000 but also an external input (e.g., hovering) applied by an input tool or a part of the user's body that is proximate to, or spaced a distance (e.g., a predetermined distance) apart from, the electronic device 1000. Furthermore, the external input may have various forms, such as force, pressure, temperature, light, and the like. The electronic device 1000 according to an embodiment of the present disclosure may sense an external input by the pen PN that generates a magnetic field. The pen PN may be referred to as the input device PN. The electronic device 1000 may sense a plurality of inputs in different forms. For example, the electronic device 1000 may sense an external input through the input device PN and an external input through the user's hand.

FIG. 1 illustrates an external input through the input device PN. The input device PN may be attached inside the electronic device 1000 or on the exterior of the electronic device 1000 and may be detached from the electronic device 1000. The electronic device 1000 may provide and receive signals corresponding to the attachment and detachment of the input device PN.

The display FS may have an active area F-AA and a peripheral area F-NAA. The peripheral area F-NAA may be adjacent to (e.g., may surround or extend around a periphery of) the active area F-AA. The peripheral area F-NAA may have a lower light transmittance than the active area F-AA and may have a color (e.g., a predetermined color).

In this embodiment, the peripheral area F-NAA may surround (e.g., may extend around a periphery of) the active area F-AA. Accordingly, the shape of the active area F-AA may be substantially defined by the peripheral area F-NAA. However, this is illustrative, and the peripheral area F-NAA may be disposed adjacent to only one side of the active area F-AA or may be omitted.

The electronic device 1000 according to an embodiment of the present disclosure may be folded about a folding axis (e.g., a predetermined folding axis). For example, as illustrated in FIG. 2A, a virtual first folding axis AX1 extending in the second direction DR2 may be defined in the electronic device 1000. The first folding axis AX1 may extend in the second direction DR2 on (or across) the display surface FS.

The display surface FS of the electronic device 1000 may have a folding area FA that is folded about the first folding axis AX1, and a first non-folding area NFA1 and a second non-folding area NFA2 spaced apart from each other in the first direction DR1 with the folding area FA therebetween. The electronic device 1000 may be folded about the first folding axis AX1 in an in-folding manner such that the first non-folding area NFA1 and the second non-folding area NFA2 face each other.

However, as illustrated in FIGS. 2B and 3, the electronic device 1000 may be (e.g., may also be) folded about a second folding axis AX2 in an out-folding manner such that the first non-folding area NFA1 and the second non-folding area NFA2 face away from each other. When the electronic device 1000 is fully folded, a display surface FS-F having a smaller area than the display surface FS in the flat (or unfolded) state may be provided as illustrated in FIG. 3.

At least one sensing area 100SA may be defined in the electronic device 1000. Although one sensing area 100SA is illustrated in FIG. 1 as being disposed in the first non-folding area NFA1, the area where the sensing area 100SA is disposed is not limited thereto. For example, a plurality of sensing areas 100SA may be disposed in the second non-folding area NFA2.

Figure 7:
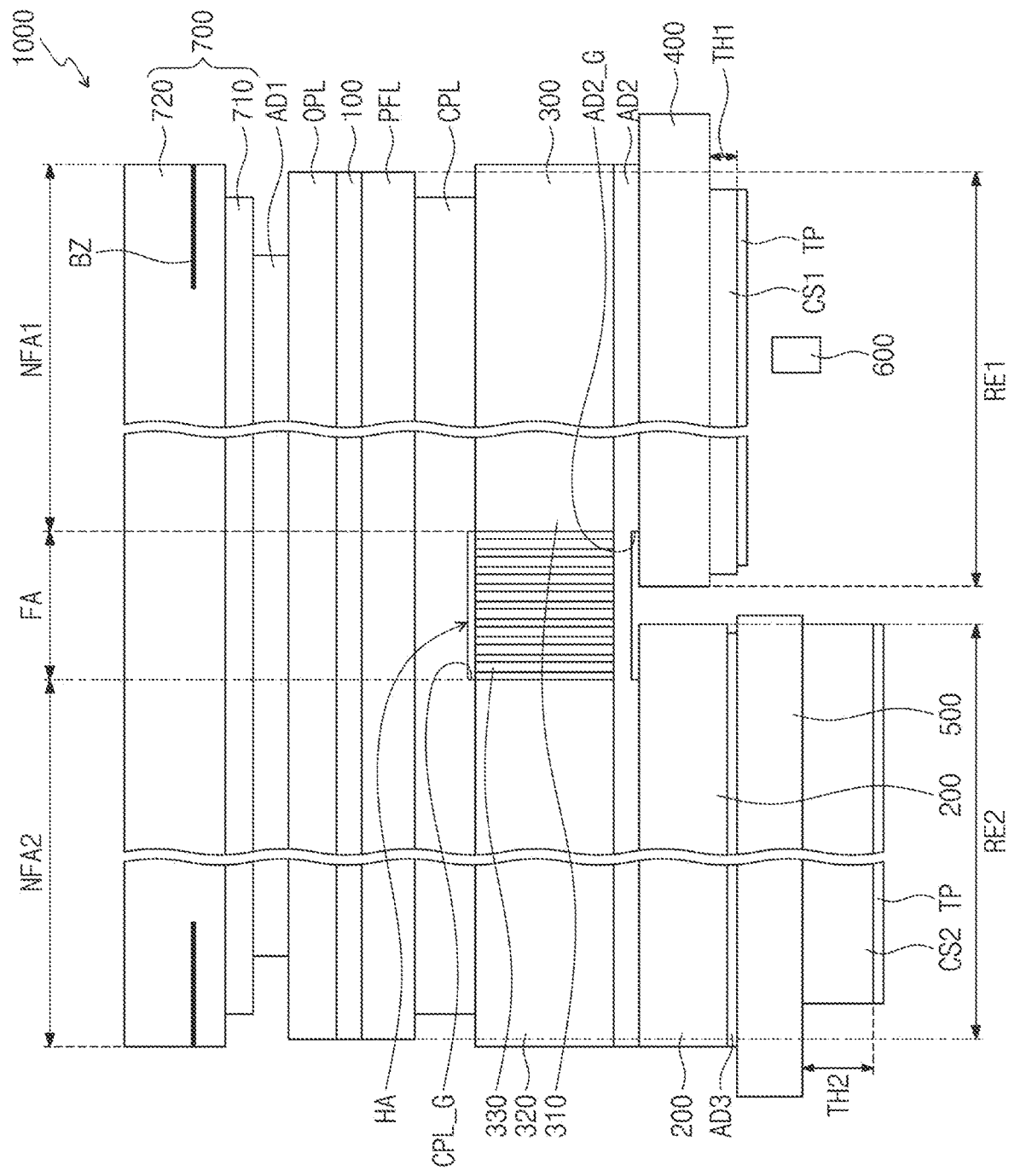
FIG. 7 is a sectional view of the electronic device illustrated in FIG. 1.

The sensing area 100SA may overlap an electronic module 600 (see, e.g., FIG. 7). The electronic module 600 may include a camera module, a proximity illuminance sensor, and the like. A part of the electronic module 600 may receive an external input through the sensing area 100SA or may provide an output to the outside through the sensing area 100SA.

The sensing area 100SA may be surrounded by the active area F-AA. However, this is an example, and the sensing area 100SA may be included in the active area F-AA. For example, the sensing area 100SA may be included in the active area F-AA and may display the image IM. The transmittance of the sensing area 100SA may be higher than the transmittance of the active area F-AA.

According to an embodiment of the present disclosure, the electronic module 600 (see, e.g., FIG. 7) may be surrounded by the active area F-AA or may overlap the active area F-AA. Accordingly, an area where the electronic module 600 is to be disposed does not have to be provided in the peripheral area F-NAA around the active area F-AA. Thus, the ratio of the area of the active area F-AA to the area of the front surface of the electronic device 1000 may be increased.

A first area AR1 and a second area AR2 may be defined in the active area F-AA. The second area AR2 may be spaced apart from the first area AR1 in the first direction DR1.

The image IM may be displayed on the first area AR1 and the second area AR2. The second area AR2 may be an area that recognizes an external input by the input device PN. The first area AR1 may be an area that does not recognize an external input by the input device PN.

When viewed on the plane, the first area AR1 may overlap the first non-folding area NFA1. When viewed on the plane, the second area AR2 may overlap the second non-folding area NFA2. However, this is an example, and the arrangement of the first area AR1 and the second area AR2 is not limited thereto. For example, when viewed on the plane, the first area AR1 may overlap the second non-folding area NFA2, and the second area AR2 may overlap the first non-folding area NFA1.

Although FIG. 1 illustrates an embodiment in which the area of the first area AR1 is equal to the area of the second area AR2 (e.g., in which the first and second areas AR1 and AR2 have the same size), the areas of the first area AR1 and the second area AR2 are not limited thereto. For example, the area of the first area AR1 and the area of the second area AR2 according to an embodiment of the present disclosure may differ from each other.

The display surface FS-F shown in FIG. 3 may overlap the first area AR1.

Figure 4:
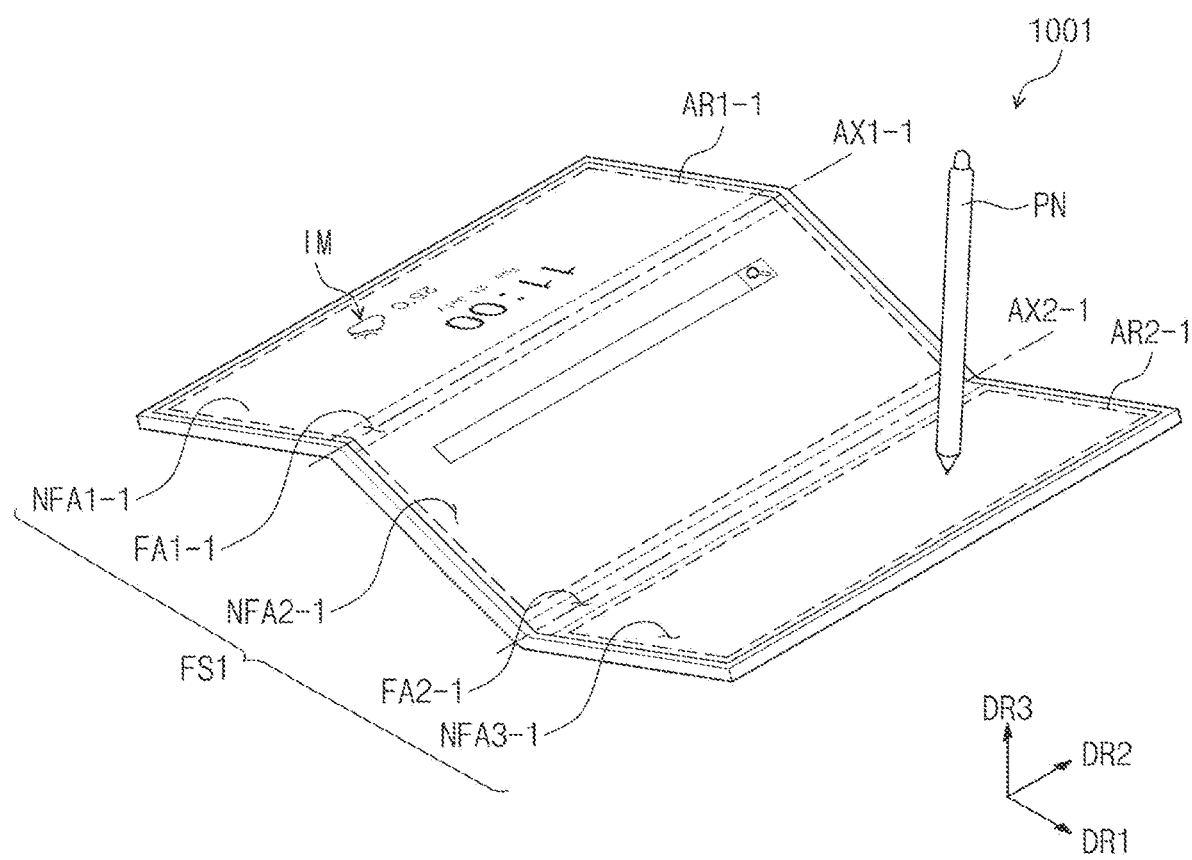
FIG. 4 is a perspective view of an electronic device according to an embodiment of the present disclosure.

FIG. 4 is a perspective view of an electronic device according to an embodiment of the present disclosure.

Referring to FIG. 4, a plurality of folding axes AX1-1 and AX2-1 may be defined in the electronic device 1001. The first folding axis AX1-1 and the second folding axis AX2-1 extend in the second direction DR2 and are spaced apart from each other in the first direction DR1. A display surface FS1 of the electronic device 1001 may display an image IM.

The electronic device 1001 may include a first folding area FA1-1, a second folding area FA2-1, a first non-folding area NFA1-1, a second non-folding area NFA2-1, and a third non-folding area NFA3-1. The first folding area FA1-1 may be folded about the first folding axis AX1-1, and the second folding area FA2-1 may be folded about the second folding axis AX2-1. The first non-folding area NFA1-1 and the second non-folding area NFA2-1 may be spaced apart from each other in the first direction DR1 with the first folding area FA1-1 therebetween, and the second non-folding area NFA2-1 and the third non-folding area NFA3-1 may be spaced apart from each other in the first direction DR1 with the second folding area FA2-1 therebetween.

The electronic device 1001 may be folded about the first folding axis AX1-1 in an out-folding manner. Accordingly, the electronic device 1001 may be folded such that the first non-folding area NFA1-1 and the second non-folding area NFA2-1 face away from each other with respect to the first folding axis AX1-1 and the first folding area FA1-1 is convex toward the first folding axis AX1-1. Furthermore, the electronic device 1001 may be folded about the second folding axis AX2-1 in an in-folding manner. Accordingly, the electronic device 1001 may be folded such that the second non-folding area NFA2-1 and the third non-folding area NFA3-1 face each other and the second folding area FA2-1 surrounds the second folding axis AX2-1.

In some embodiments, the electronic device 1001 may be folded about the first folding axis AX1-1 and the second folding axis AX2-1 in the same manner. In addition, an electronic device according to an embodiment of the present disclosure may be folded about three or more folding axes, and the extension direction of the folding axes may be defined to be a direction different from the second direction DR2. As long as the electronic device 1001 according to an embodiment of the present disclosure can sense an external input and can be folded, the electronic device 1001 may include various embodiments and is not limited to any one embodiment.

A first area AR1-1 and a second area AR2-1 may be defined in an active area of the display surface FS1. The second area AR2-1 may be spaced apart from the first area AR1-1 in the first direction DR1.

The image IM may be displayed on the first area AR1-1 and the second area AR2-1. The second area AR2-1 may be an area that recognizes an external input by an input device PN. The first area AR1-1 may be an area that does not recognize an external input by the input device PN.

When viewed on the plane, the second area AR2-1 may overlap the third non-folding area NFA3-1. When viewed on the plane, the first area AR1-1 may overlap the first non-folding area NFA1-1 and the second non-folding area NFA2-1.

Although an embodiment in which the area of the first area AR1-1 is larger than the area of the second area AR2-1 is illustrated in FIG. 4, the areas of the first area AR1-1 and the second area AR2-1 according to an embodiment of the present disclosure are not limited thereto. For example, the area of the second area AR2-1 according to an embodiment of the present disclosure may be larger than the area of the first area AR1-1.

Figure 5:
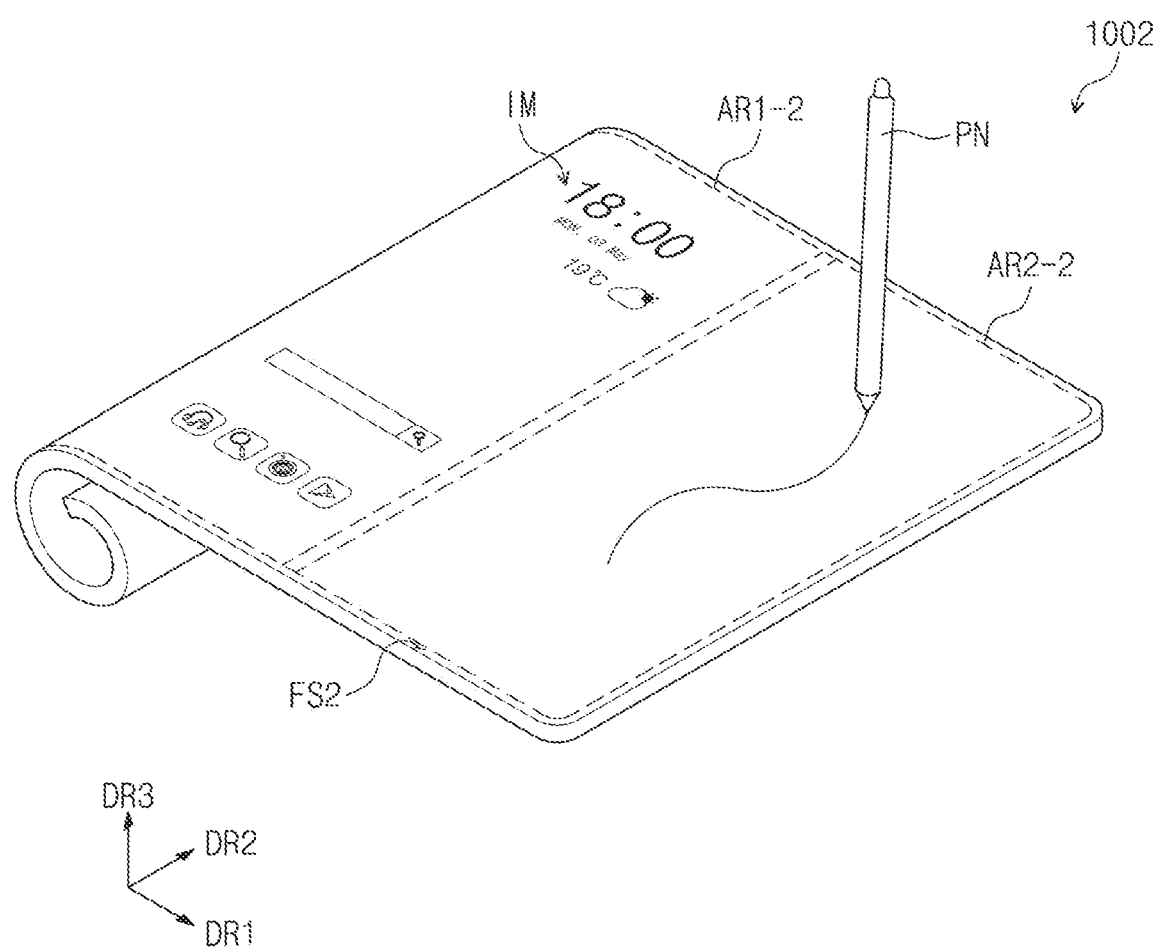
FIG. 5 is a perspective view of an electronic device according to an embodiment of the present disclosure.

FIG. 5 is a perspective view of an electronic device according to an embodiment of the present disclosure.

Referring to FIG. 5, the upper surface of the electronic device 1002 may be defined as a display surface FS2. The display surface FS2 may have a plane defined by the first direction DR1 and the second direction DR2. An Image IM generated by the electronic device 1002 may be provided to a user through the display surface FS2.

The electronic device 1002 may be a flexible electronic device that can be rolled. For example, the electronic device 1002 may be a rollable electronic device.

The electronic device 1002 may be rolled in the first direction DR1. The electronic device 1002 may be rolled in a cylindrical shape. The user may carry the rolled electronic device 1002 and may unroll the electronic device 1002 as needed to watch the image IM. Accordingly, the portability of the electronic device 1002 may be improved.

A first area AR1-2 and a second area AR2-2 may be defined in an active area of the display surface FS2. The second area AR2-2 may be spaced apart from the first area AR1-2 in the first direction DR1.

The image IM may be displayed on the first area AR1-2 and the second area AR2-2. The second area AR2-2 may be an area that recognizes an external input by an input device PN. The first area AR1-2 may be an area that does not recognize an external input by the input device PN.

Although an embodiment in which the area of the first area AR1-2 is larger than the area of the second area AR2-2 is illustrated in FIG. 5, the areas of the first area AR1-2 and the second area AR2-2 are not limited thereto. For example, the area of the second area AR2-2 according to an embodiment of the present disclosure may be larger than the area of the first area AR1-2.

Figure 6:
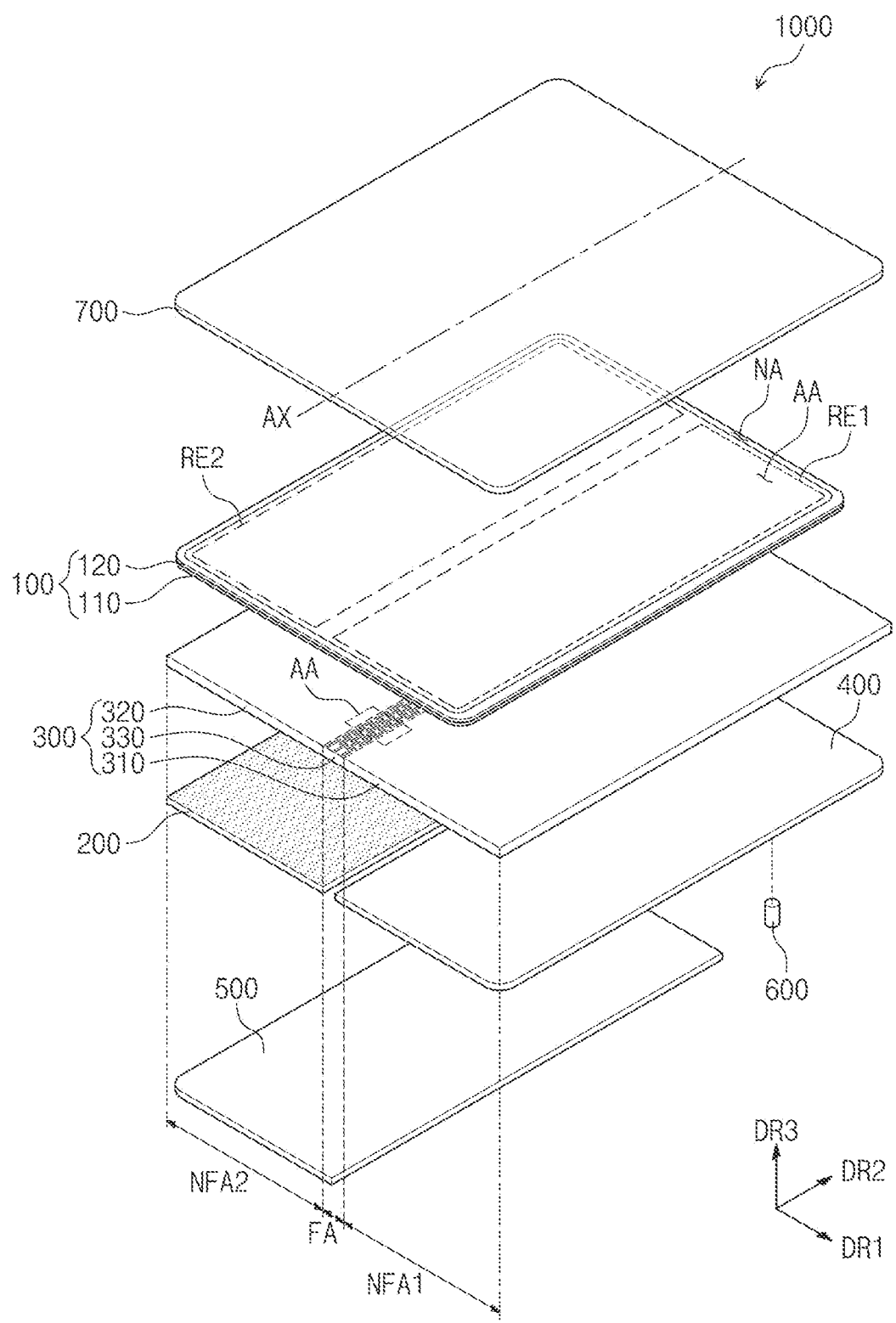
FIG. 6 is an exploded perspective view of the electronic device illustrated in FIG. 1.

FIG. 6 is an exploded perspective view of the electronic device 1000 according to an embodiment of the present disclosure.

Referring to FIG. 6, the electronic device 1000 may include a display panel 100, a first input sensor 200, a support plate 300, a first plate 400, a second plate 500, an electronic module 600, and a window 700.

The display panel 100 may be a flexible panel. The display panel 100 may have an active area AA and a peripheral area NA. The active area AA may display the image IM (see, e.g., FIG. 1) or may sense an external input applied from the outside. The peripheral area NA may be adjacent to the active area AA. In this embodiment, the peripheral area NA is illustrated as surrounding (e.g., extending around a periphery of) the active area AA, but it is not limited thereto.

The display panel 100 may include a display layer 110 and a sensor layer 120. Descriptions thereof will be given below. The sensor layer 120 may be referred to as the second input sensor 120. The display panel 100 may have a thickness of about 40 µm.

A first area RE1 and a second area RE2 may be defined in the display panel 100. The second area RE2 may be spaced apart from the first area RE1 in the first direction DR1. When viewed on the plane, the first area RE1 may overlap the first area AR1 of the electronic device 1000. When viewed on the plane, the second area RE2 may overlap the second area AR2 of the electronic device 1000.

The image IM (see, e.g., FIG. 1) may be displayed on the first area RE1 and the second area RE2. The second area RE2 may be an area that recognizes an external input by the input device PN (see, e.g., FIG. 1). The first area RE1 may be an area that does not recognize an external input by the input device PN (see, e.g., FIG. 1).

The first input sensor 200 may be disposed under the support plate 300. The first input sensor 200 may be disposed between the display panel 100 and the second plate 500. The first input sensor 200 may be spaced apart from the second area RE2 with the support plate 300 therebetween. The first input sensor 200 may have a greater thickness than the display panel 100. For example, the first input sensor 200 may have a thickness of about 105 µm.

The first input sensor 200 may sense an external input different from an external input sensed by the display panel 100, for example, an external input sensed by the second input sensor 120. The first input sensor 200 may sense an external input by the input device PN (see, e.g., FIG. 1), and the second input sensor 120 may sense an external input by a part of a user's body. For example, the input device PN may include an electro-magnetic pen, and the part of the user's body may include the user's hand.

The first input sensor 200 may sense the position or intensity of an input of the input device PN that is input to the window 700. For example, the first input sensor 200 may include a digitizer. The first input sensor 200 may be driven by a method using electro-magnetic resonance (EMR). However, this is an example, and as long as the first input sensor 200 is capable of sensing an input of the input device PN, the first input sensor 200 may be driven in various suitable ways and is not limited to any one embodiment.

When viewed on the plane, the first input sensor 200 may overlap the second area RE2. The first input sensor 200 may overlap the second non-folding area N FA2.

The support plate 300 may be disposed under the display panel 100. The support plate 300 may support the display panel 100. The support plate 300 may include a first support part 310, a second support part 320, and a folding part 330. The first support part 310 and the second support part 320 may be spaced apart from each other in the first direction DR1 with the folding part 330 therebetween. The support plate 300 may have a greater thickness than the display panel 100. For example, the support plate 300 may have a thickness of about 150 µm.

When viewed on the plane, the first support part 310 may overlap the first area RE1. The first support part 310 may overlap the first non-folding area NFA1.

When viewed on the plane, the second support part 320 may overlap the second area RE2. The second support part 320 may overlap the second non-folding area NFA2.

The first support part 310 and the second support part 320 may provide insulation. For example, the first support part 310 and the second support part 320 may be formed of plastic or glass.

The folding part 330 may overlap the folding area FA. A plurality of openings HA (see, e.g., FIG. 7) may be formed through the folding part 330. The folding part 330, when folded, may be easily deformed due to the plurality of openings HA. The folding part 330 may be formed of the same material as that of the first support part 310 and the second support part 320. However, this is an example, and the folding part 330 according to an embodiment of the present disclosure may include (or may contain) a different material than the first support part 310 and the second support part 320. For example, the folding part 330 may contain a single metal or an alloy. Accordingly, the folding part 330 may stably protect a folding area of the display panel 100 even in a folded state.

The first plate 400 may be disposed under the support plate 300. The first plate 400 may be spaced apart from the first area RE1 with the support plate 300 therebetween. The first plate 400 may support the display panel 100. When viewed on the plane, the first plate 400 may overlap the first area RE1. The first plate 400 may overlap the first non-folding area NFA1.

The first plate 400 may have a higher modulus (e.g., a higher modulus of elasticity) than the support plate 300.

Accordingly, the first plate 400 may stably protect the display panel 100 from an external impact.

The first plate 400 and the first input sensor 200 may face each other. The first plate 400 and the first input sensor 200 may be spaced apart from each other in the first direction DR1. When viewed on the plane, the first plate 400 and the first input sensor 200 may be spaced apart from each other with the folding area FA therebetween. According to embodiments of the present disclosure, the first input sensor 200 and the first plate 400 may not suffer from stress caused by folding. Accordingly, damage to the first input sensor 200 and the first plate 400 due to the folding may be mitigated or prevented.

The second plate 500 may be disposed under the first input sensor 200. The second plate 500 may be spaced apart from the support plate 300 with the first input sensor 200 therebetween. The second plate 500 may support the first input sensor 200. When viewed on the plane, the second plate 500 may overlap the second area RE2. The second plate 500 may overlap the second non-folding area NFA2.

The second plate 500 may have a higher modulus (e.g., a higher modulus of elasticity) than the support plate 300. Accordingly, the second plate 500 may stably protect the first input sensor 200 and the display panel 100 from an external impact.

The electronic module 600 may be disposed under the first plate 400. The electronic module 600 may include at least one of a camera, a speaker, a light detection sensor, or a heat detection sensor. The electronic module 600 may include a plurality of components and is not limited to any one embodiment.

The electronic module 600 may be disposed to overlap the active area AA. An opening (e.g., a through-hole) may be defined in the display panel 100 to correspond to the electronic module 600. However, this is an example, and the opening according to an embodiment of the present disclosure may be omitted. Furthermore, in the electronic device 1000 according to an embodiment of the present disclosure, the electronic module 600 may be disposed so as not to overlap the active area AA.

The window 700 may be disposed over the display panel 100. The window 700 may overlap the active area AA of the display panel 100 and may provide an optically transparent area. The window 700 may provide the display surface FS (see, e.g., FIG. 1) of the electronic device 1000. An external input of the input device PN may be substantially applied to the window 700. The image IM displayed on the display panel 100 may be visible to the user through the window 700.

The window 700 may include a thin glass film or a synthetic resin film. When the window 700 includes the thin glass film, the window 700 may have a thickness of 100 μm or less, for example, a thickness of 30 μm. However, the thickness of the window 700 is not limited thereto. When the window 700 includes the synthetic resin film, the window 700 may include a polyimide (PI) film or a polyethylene terephthalate (PET) film.

The window 700 may have a multi-layer structure or a single-layer structure. For example, the window 700 may include a plurality of synthetic resin films coupled through an adhesive or may include a glass substrate and a synthetic resin film coupled through an adhesive. The window 700 may be formed of a flexible material. Accordingly, the window 700 may be folded or unfolded about the folding axis AX. For example, when the display panel 100 is deformed, the window 700 may also be deformed in response to the deformation of the display panel 100.

The window 700 may alleviate an external impact at the same time as allowing the image IM from the display panel 100 to transmit through the window 700, thereby preventing or mitigating malfunction of or damage to the display panel 100 due to the external impact. The external impact may be an external force expressed as pressure, stress, or the like and may refer to a force that causes a defect in the display panel 100.

The electronic device 1000 may further include a protective layer disposed on the window 700. The protective layer may be a layer for improving the impact resistance of the window 700 and preventing or substantially preventing the window 700 from being scattered when damaged. The protective layer may include (or may contain) at least one selected from the group consisting of a urethane-based resin, an epoxy-based resin, a polyester-based resin, a polyether-based resin, an acrylate-based resin, an acrylonitrile-butadiene-styrene (ABS) resin, and rubber. In an embodiment of the present disclosure, the protective layer may contain at least one of phenylene, polyethylene terephthalate (PET), polyimide (PI), polyamide (PAI), polyethylene naphthalate (PEN), or polycarbonate (PC).

The electronic device 1000 may further include at least one functional layer disposed between the display panel 100 and the window 700. For example, the functional layer may be an anti-reflection layer that blocks reflection of external light. The anti-reflection layer may prevent or substantially prevent elements constituting the display panel 100 from being visible from the outside due to external light incident on the front surface of the electronic device 1000. The anti-reflection layer may include a phase retarder, a polarizer, or a color filter.

FIG. 7 is a sectional view of the electronic device 1000 according to an embodiment of the present disclosure. In describing FIG. 7, the components described above with reference to FIG. 6 will be assigned with identical reference numerals, and repeated descriptions thereof may be omitted.

Referring to FIG. 7, the electronic device 1000 may include the display panel 100, the first input sensor 200, the support plate 300, the first plate 400, the second plate 500, a first cushion layer CS1, a second cushion layer CS2, the electronic module 600, and the window 700 and may further include various other functional layers.

An optical layer OPL and an adhesive layer AD1 may be disposed between the window 700 and the display panel 100. The window 700 may include a first layer 710, a second layer 720, and a bezel pattern BZ. The first layer 710 may include (or may contain) glass. For example, the first layer 710 may have a thickness of 10 μm or less. Accordingly, the first layer 710 may be easily folded.

The second layer 720 may be disposed on the first layer 710. The second layer 720 may include (or may contain) a material having a lower modulus (e.g., a lower modulus of elasticity) than the first layer 710. For example, the second layer 720 may be a film including (or containing) an organic material. The second layer 720 may have a greater thickness than the first layer 710. For example, the second layer 720 may have a thickness of 105 μm or less. The second layer 720 may protect the upper surface of the first layer 710.

The bezel pattern BZ may be inserted into the second layer 720. However, this is an example, and the bezel pattern BZ may be disposed on the lower or upper surface of the second layer 720. The bezel pattern BZ may be a colored pattern or a reflection pattern that has a color (e.g., a predetermined color). The bezel pattern BZ may define the above-described peripheral area F-NAA (see, e.g., FIG. 1). This is an example, and the bezel pattern BZ may be omitted from the window 700 in some embodiments. Furthermore, the window 700 according to an embodiment of the present disclosure may be implemented with a single layer or may further include other functional layers. The window 700 is not limited to any one embodiment.

The optical layer OPL may be disposed over the display panel 100. The optical layer OPL may decrease the reflectivity of external light. The optical layer OPL may include a stretchable synthetic resin film. For example, the optical layer OPL may be provided by dyeing a polyvinyl alcohol (PVA) film with an iodine compound. In some embodiments, the optical layer OPL may include a color filter. As long as the optical layer OPL is capable of reducing the reflectivity of external light, the optical layer OPL may include various layers and is not limited to any one embodiment.

The optical layer OPL and the window 700 may be coupled by the adhesive layer AD1. The adhesive layer AD1 may include (or may contain) an optical clear adhesive (OCA), an optical clear resin (OCR), or a pressure sensitive adhesive (PSA). Adhesive layers, to be described below, may include (or may contain) the same material as the adhesive layer AD1 and may include (or may contain) a conventional adhesive or sticky material. In some embodiments, the adhesive layer AD1 may have a thickness of about 50 μm.

The first area RE1 and the second area RE2 may be defined in the display panel 100. The second area RE2 may be spaced apart from the first area RE1 in the first direction DR1.

The image IM (see, e.g., FIG. 1) may be displayed on the first area RE1 and the second area RE2. The second area RE2 may be an area that recognizes an external input by the input device PN. The first area RE1 may be an area that does not recognize an external input by the input device PN.

A panel protection film PFL and a lower protective film CPL may be disposed between the display panel 100 and the support plate 300.

The panel protection film PFL may be disposed under the display panel 100. The panel protection film PFL may protect a lower portion of the display panel 100. The panel protection film PFL may include (or may contain) a flexible plastic material. For example, the panel protection film PFL may include (or may contain) polyethylene terephthalate (PET). The panel protection film PFL may have a greater thickness than the display panel 100. For example, the panel protection film PFL may have a thickness of about 68 μm.

The lower protective film CPL may be disposed under the panel protection film PFL. The lower protective film CPL may have a color (e.g., a predetermined color). The lower protective film CPL may protect the rear surface of the display panel 100 and may prevent the rear surface of the display panel 100 from being visible by light. The lower protective film CPL may be formed of a material having a high light absorbance.

A depression CPL_G may be formed in the lower protective film CPL at an area overlapping the folding area FA. The depression CPL_G may reduce folding stress by decreasing the thickness of the lower protective film CPL in the folding area FA. In some embodiments, an adhesive layer may be added to the depression CPL_G to improve the coupling force between the lower protective film CPL and the support plate 300.

The support plate 300 may include the first support part 310, the second support part 320, and the folding part 330. The folding part 330 may be disposed between the first support part 310 and the second support part 320.

When viewed on the plane, at least a portion of the first support part 310 may overlap the first area RE1.

When viewed on the plane, at least a portion of the second support part 320 may overlap the second area RE2.

The folding part 330 may have the plurality of openings HA defined therein. The plurality of openings HA may be spaced apart from each other in the first direction DR1. Accordingly, the folding part 330, when viewed on the plane, may have a lattice shape. As the plurality of openings HA are deformed, the support plate 300 may be more easily deformed in the folding area FA. The plurality of openings HA may be filled with a material having high ductility.

The support plate 300 may be coupled with the first input sensor 200 and the first plate 400 by an adhesive layer AD2. A depression AD2_G may be formed in the adhesive layer AD2 overlapping the folding area FA. Folding stress in the folding area FA may be reduced by the depression AD2_G. In some embodiments, the depression AD2_G may be omitted from the adhesive layer AD2 or the portion of the adhesive layer AD2 that overlaps the folding area FA may be omitted. However, the present disclosure is not limited to any one embodiment.

The first plate 400 and the first input sensor 200 may be directly disposed on the bottom of the adhesive layer AD2.

The first plate 400 and the first input sensor 200 may face each other. The first plate 400 and the first input sensor 200 may be spaced apart from each other in the first direction DR1. When viewed on the plane, the first input sensor 200 and the first plate 400 may not overlap each other.

When viewed on the plane, the first plate 400 may overlap the first area RE1 and may not overlap the second area RE2.

When viewed on the plane, the first input sensor 200 may overlap the second area RE2 and may not overlap the first area RE1.

According to embodiments of the present disclosure, the second area RE2 may be an area that senses an input by the input device PN (see, e.g., FIG. 1), and the first area RE1 may be an area that does not sense an input by the input device PN. The first input sensor 200 that senses an input by the input device PN may not be disposed in the first area RE1, and a space may be provided in the first area RE1. The space in the electronic device 1000 (e.g., the space in the first area RE1) may be used (or occupied). For example, the electronic module 600 may be disposed in the space. The thickness of the electronic device 1000 may be decreased. Accordingly, the electronic device 1000 may be made slim.

The first plate 400 may have a higher modulus (e.g., a higher modulus of elasticity) than the support plate 300. For example, the first plate 400 may include (or may contain) an aluminum alloy or carbon fiber reinforced plastic.

The first cushion layer CS1 and an insulating layer TP may be disposed under the first plate 400. When viewed on the plane, the first cushion layer CS1 may overlap the first area RE1.

The first cushion layer CS1 may absorb an external impact to protect the display panel 100. The first cushion layer CS1 may include a foam sheet having an elasticity (e.g., a foam sheet having a predetermined elasticity). The first cushion layer CS1 may include a sponge or polyurethane. The first cushion layer CS1 may have a first thickness TH1.

The insulating layer TP may be disposed under the first cushion layer CS1. The insulating layer TP may include an insulating film. The insulating layer TP may prevent introduction of static electricity.

The second plate 500 may be disposed under the first input sensor 200. When viewed on the plane, the second plate 500 may overlap the second support part 320. The second plate 500 may have a different material from the first plate 400.

The first plate 400 may be lighter in weight than the second plate 500. For example, the second plate 500 may include (or may contain) metal, such as copper alloy or steel use stainless (SUS).

According to the present disclosure, the second area RE2 may be an area that senses an input by the input device PN (see, e.g., FIG. 1), and the first area RE1 may be an area that does not sense an input by the input device PN. The input device PN may provide an input through contact with the electronic device 1000, and a force may be applied to the second area RE2 of the display panel 100. For example, compared to the second area RE2, the first area RE1 may have a low possibility that an impact is applied to the display panel 100 by an input of the input device PN. Although the first plate 400 is lighter in weight than the second plate 500, the first plate 400 may protect the display panel 100. Accordingly, the electronic device 1000 may be made light.

The second plate 500 and the first input sensor 200 may be coupled by an adhesive layer AD3.

The second cushion layer CS2 and an insulating layer TP may be disposed under the second plate 500. When viewed on the plane, the second cushion layer CS2 may overlap the second area RE2.

The second cushion layer CS2 may absorb an external impact to protect the display panel 100. The second cushion layer CS2 may include a foam sheet having an elasticity (e.g., a foam sheet having a predetermined elasticity). The second cushion layer CS2 may include a sponge or polyurethane. The second cushion layer CS2 may have a second thickness TH2. The first thickness TH1 may be smaller than the second thickness TH2.

According to embodiments of the present disclosure, the second area RE2 may be an area that senses an input by the input device PN, and the first area RE1 may be an area that does not sense an input by the input device PN. The input device PN may provide an input through contact with the electronic device 1000, and a force may be applied to the second area RE2 of the display panel 100. For example, compared to the second area RE2, the first area RE1 may have a low possibility that an impact is applied to the display panel 100 by an input of the input device PN. Although the first thickness TH1 of the first cushion layer CS1 is smaller than the second thickness TH2 of the second cushion layer CS2, the first cushion layer CS1 may protect the display panel 100. Due to the first thickness TH1, a space may be provided in the first area RE1. The space of the electronic device 1000 may be used. The electronic module 600 may be disposed in the space. The thickness of the electronic device 1000 may be decreased. Accordingly, the electronic device 1000 may be made slim.

The insulating layer TP may be disposed under the second cushion layer CS2. The insulating layer TP may include an insulating film. The insulating layer TP may prevent introduction of static electricity.

The electronic module 600 may be disposed under the first cushion layer CS1. When viewed on the plane, the electronic module 600 may overlap the first area RE1.

Figure 8:
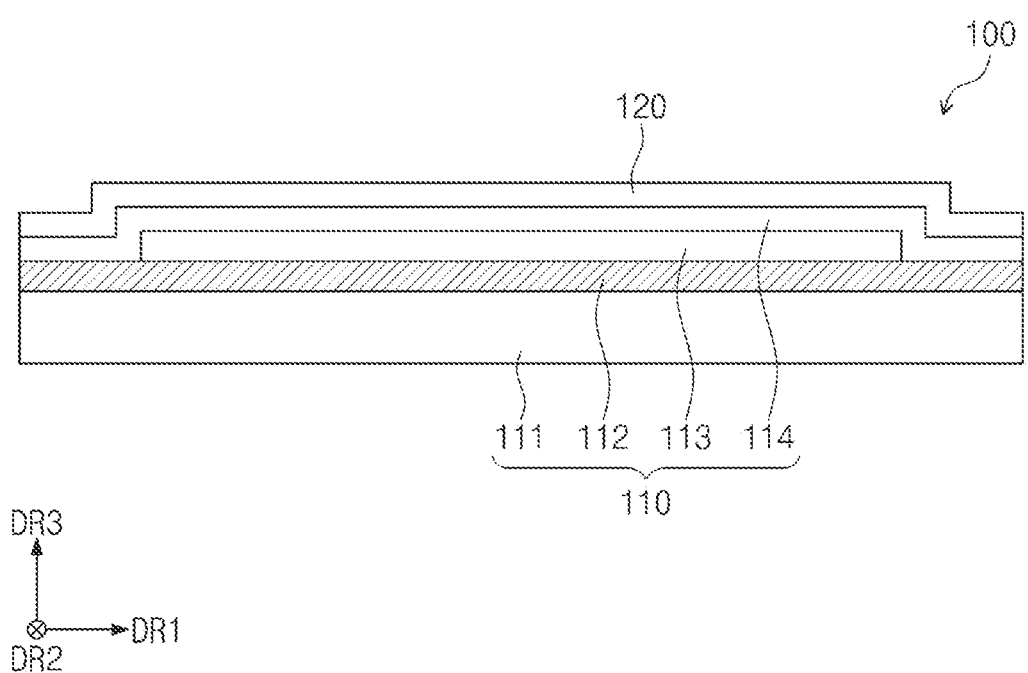
FIG. 8 is a sectional view of a display panel illustrated in FIG. 7 according to an embodiment of the present disclosure.

FIG. 8 is a sectional view of the display panel according to an embodiment of the present disclosure.

Referring to FIG. 8, the display panel 100 may be a component that generates an image and senses an external input. For example, the display panel 100 may include the display layer 110 and the sensor layer 120.

The display layer 110 may be a component that substantially generates the image IM (see, e.g., FIG. 1). The display layer 110 may be an emissive display layer but is not particularly limited. For example, the display layer 110 may be an organic light emitting display layer, an inorganic light emitting display layer, a micro-LED display layer, or a nano-LED display layer. Light emitting elements of the organic light emitting display layer may include an organic light emitting material. Light emitting elements of the inorganic light emitting display layer may include a quantum dot, a quantum rod, and the like. Light emitting elements of the micro-LED display layer may include a micro-LED. Light emitting elements of the nano-LED display layer may include a nano-LED.

The display layer 110 may include a base layer 111, a circuit layer 112, a light emitting element layer 113, and an encapsulation layer 114.

The base layer 111 may include a synthetic resin film. The synthetic resin layer may include (or may contain) a thermosetting resin. The base layer 111 may have a multi-layer structure. For example, the base layer 111 may include a first synthetic resin layer, a silicon oxide ($SiO_x$) layer disposed over the first synthetic resin layer, an amorphous silicon (a-Si) layer disposed over the silicon oxide layer, and a second synthetic resin layer disposed over the amorphous silicon layer. The silicon oxide layer and the amorphous silicon layer may be referred to as the base barrier layer. The first synthetic layer and the second synthetic resin layer may each include (or contain) a polyimide-based resin. In some embodiments, the first synthetic layer and the second synthetic resin layer may each include (or contain) at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. A "~~"-based resin, as used herein, may refer to a resin containing a "~~" functional group. In addition, the base layer 111 may include a glass substrate, an organic/inorganic composite substrate, or the like.

The light emitting element layer 113 may be disposed over the circuit layer 112. The light emitting element layer 113 may include light emitting elements. For example, the light emitting element layer 113 may include an organic light emitting material, a quantum dot, a quantum rod, a micro-LED, or a nano-LED.

The encapsulation layer 114 may be disposed over the light emitting element layer 113. The encapsulation layer 114 may include an inorganic layer, an organic layer, and an inorganic layer sequentially stacked one above another. However, layers constituting the encapsulation layer 114 are not limited thereto.

The inorganic layers may protect the light emitting element layer 113 from moisture and oxygen, and the organic layer may protect the light emitting element layer 113 from foreign matter, such as dust particles. The inorganic layers may include a silicon nitride layer, a silicon oxynitride layer, a silicon oxide layer, a titanium oxide layer, or an aluminum oxide layer. The organic layer may include, but is not limited to, an acrylate-based organic layer.

The sensor layer 120 may be disposed over the display layer 110. The sensor layer 120 may sense an external input applied from the outside. The external input may be an input of a user. The input of the user may include various forms of external inputs, such as a part of the user's body, light, heat, a pen, pressure, or the like. In this embodiment, the sensor layer 120 may sense a signal transferred by the user's hand.

The sensor layer 120 may be formed on the display layer 110 through a continuous process. In such an embodiment, the sensor layer 120 may be expressed as being directly disposed on the display layer 110. When the sensor layer 120 is directly disposed on the display layer 110, a third component is not disposed between the sensor layer 120 and the display layer 110. For example, a separate adhesive member may not be disposed between the sensor layer 120 and the display layer 110.

In some embodiments, the sensor layer 120 may be coupled with the display layer 110 through an adhesive member. The adhesive member may include (or may contain) a conventional adhesive or sticky substance.

The sensor layer 120 may include a plurality of sensing electrodes. The sensing electrodes may be disposed in the active area AA (see, e.g., FIG. 6). The sensor layer 120 may sense the position or intensity of an applied external input through a change in the capacitance between the sensing electrodes or a change in the resistances of the sensing electrodes by the applied external input.

Figure 9:
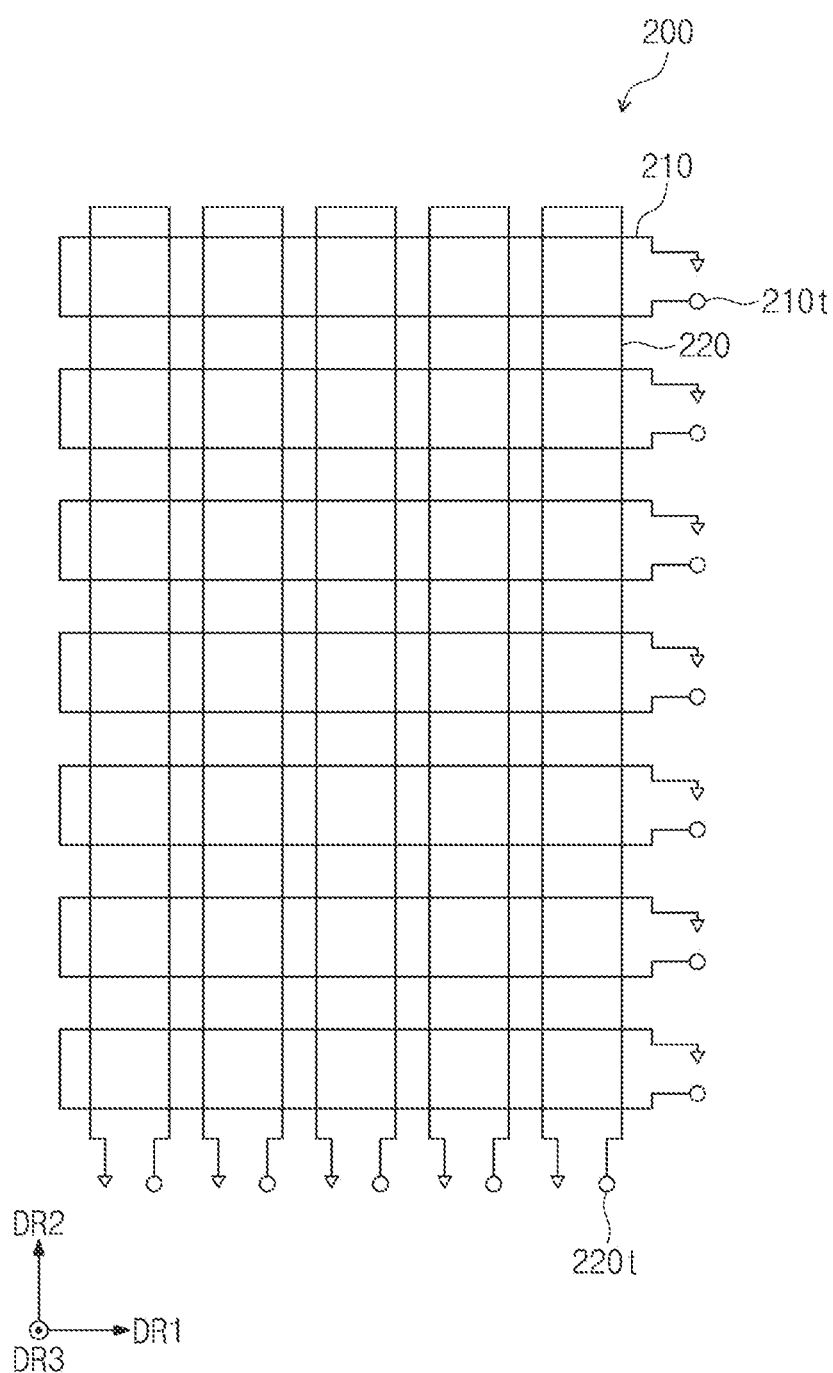
FIG. 9 illustrates a first input sensor according to an embodiment of the present disclosure.

FIG. 9 illustrates the first input sensor according to an embodiment of the present disclosure.

Referring to FIG. 9, the first input sensor 200 may sense an external input by an electro-magnetic resonance (EMR) method.

The electro-magnetic resonance (EMR) method may generate a magnetic field in a resonance circuit inside the input device PN (see, e.g., FIG. 1), may induce signals in a plurality of coils in the first input sensor 200 by the oscillating magnetic field, and may detect the position of the input device PN through the signals induced in the coils.

The first input sensor 200 may include a plurality of first coils 210 and a plurality of second coils 220. The plurality of first coils 210 may be referred to as the driving coils, and the plurality of second coils 220 may be referred to as the sensing coils.

The plurality of first coils 210 may be arranged to insulatively cross (e.g., intersect) the plurality of second coils 220. To sense the input device PN, AC signals may be sequentially provided to first terminals 210t of the plurality of first coils 210. The plurality of first coils 210 may be formed in a closed-curve form, and when currents flow in the plurality of first coils 210, magnetic field lines may be induced between the plurality of first coils 210 and the plurality of second coils 220. The plurality of second coils 220 may output, through second terminals 220t of the plurality of second coils 220, detection signals of an induced electro-magnetic force emitted from the input device PN.

Although the configuration of a digitizer is illustrated in FIG. 9, the present disclosure is not limited thereto. Furthermore, the arrangement of the plurality of first coils 210 and the plurality of second coils 220 may be modified in various suitable ways without being limited to that illustrated in FIG. 9.

According to the above description, the second area may be an area that senses an input by an input device, and the first area may be an area that does not sense an input by the input device. The input sensor that senses an input by the input device may not be disposed in the first area, and a space may be provided in the first area. The space of the electronic device may be used (or occupied). The thickness of the electronic device may be decreased. Accordingly, the electronic device may be made slim.

While the present disclosure has been described with reference to embodiments thereof, it will be apparent to those of ordinary skill in the art that various changes and modifications may be made thereto without departing from the spirit and scope of the present disclosure as set forth in the following claims and their equivalents.

What is claimed is:

1. An electronic device comprising:
a display panel having a first area and a second area, the second area being spaced apart from the first area in a first direction;
a window above the display panel in a third direction crossing the first direction,
a support plate under the display panel in the third direction, the support plate comprising:
a folding part configured to be folded about a folding axis extending in a second direction crossing the first direction and the third direction, the folding part having a plurality of openings defined therein;
a first support part extending from the folding part in the first direction; and
a second support part spaced apart from the first support part with the folding part therebetween in the first direction;
a first plate under the support plate in the third direction and overlapping the first area of the display panel in the third direction; and
an input sensor configured to sense an external input, the input sensor being under the support plate in the third direction and overlapping the second area of the display panel in the third direction,
wherein the first plate and the input sensor face each other in the first direction.

2. The electronic device of claim 1, wherein, when viewed on a plane, at least a portion of the first support part overlaps the first area.

3. The electronic device of claim 1, wherein, when viewed on a plane, at least a portion of the second support part overlaps the second area.

4. The electronic device of claim 1, wherein, when viewed on a plane, the first area does not overlap the input sensor.

5. The electronic device of claim 1, wherein, when viewed on a plane, the second area does not overlap the first plate.

6. The electronic device of claim 1, further comprising a second plate under the input sensor,
wherein, when viewed on a plane, the second plate overlaps the second support part.

7. The electronic device of claim 6, wherein the second plate has a different material from the first plate.

8. The electronic device of claim 6, further comprising:
a first cushion layer under the first plate; and
a second cushion layer under the second plate.

9. The electronic device of claim 8, wherein the first cushion layer has a smaller thickness than the second cushion layer.

10. The electronic device of claim 8, wherein, when viewed on the plane, the first cushion layer overlaps the first area.

11. The electronic device of claim 8, wherein, when viewed on the plane, the second cushion layer overlaps the second area.

12. The electronic device of claim 1,
wherein the plurality of openings are spaced apart from each other in the first direction.

13. The electronic device of claim 1, further comprising an adhesive layer under the support plate,
wherein the input sensor and the first plate are directly on a bottom of the adhesive layer.

14. The electronic device of claim 1, wherein, when viewed on a plane, the input sensor and the first plate do not overlap each other.

15. An electronic device comprising:
a display panel having a first non-folding area, a second non-folding area, and a folding area, the second non-folding area being spaced apart from the first non-folding area in a first direction, and the folding area being between the first non-folding area and the second non-folding area, the display panel being configured to be folded at the folding area along a folding axis extending in a second direction crossing the first direction;
a support plate under the display panel in a third direction crossing the first direction and the second direction;
a first plate overlapping the first non-folding area when viewed on a plane in the third direction and under the support plate; and
an input sensor overlapping the second non-folding area when viewed on the plane in the third direction and under the support plate, the input sensor being configured to sense an external input,
wherein, when viewed on the plane in the third direction, the input sensor and the first plate do not overlap each other.

16. The electronic device of claim 15, wherein, when viewed on the plane, the first non-folding area does not overlap the input sensor.

17. The electronic device of claim 15, wherein, when viewed on the plane, the second non-folding area does not overlap the first plate.

18. The electronic device of claim 15, further comprising:
a first cushion layer under the first plate; and
a second cushion layer under the input sensor.

19. The electronic device of claim 18, wherein the first cushion layer has a greater thickness than the second cushion layer.

20. The electronic device of claim 18, wherein, when viewed on the plane, the first cushion layer does not overlap the first non-folding area and the second cushion layer does not overlap the second non-folding area.

* * * * *